(12) United States Patent
Yoshimura et al.

(10) Patent No.: US 7,204,473 B2
(45) Date of Patent: Apr. 17, 2007

(54) SOLENOID VALVE

(75) Inventors: Shinichi Yoshimura, Tsukuba-gun (JP); Masaru Narita, Tsukuba-gun (JP)

(73) Assignee: SMC Corporation, Tokyo (JP)

( * ) Notice: Subject to any disclaimer, the term of this patent is extended or adjusted under 35 U.S.C. 154(b) by 22 days.

(21) Appl. No.: 11/263,915

(22) Filed: Nov. 2, 2005

(65) Prior Publication Data

US 2006/0108551 A1 May 25, 2006

(30) Foreign Application Priority Data

Nov. 24, 2004 (JP) ............................. 2004-339207

(51) Int. Cl.
*F16K 31/02* (2006.01)
(52) U.S. Cl. ...................... 251/129.15; 137/625.25; 335/297
(58) Field of Classification Search ........... 251/129.15; 335/255, 296, 297, 299; 137/625.25
See application file for complete search history.

(56) References Cited

U.S. PATENT DOCUMENTS

| | | | | |
|---|---|---|---|---|
| 3,484,076 A | * | 12/1969 | Naumann | ............... 251/129.15 |
| 4,341,241 A | * | 7/1982 | Baker | ........................ 137/554 |
| 4,552,179 A | * | 11/1985 | Tarusawa et al. | ...... 137/625.65 |
| 6,390,445 B2 | * | 5/2002 | Fukano | .................. 251/129.19 |
| 6,655,411 B2 | * | 12/2003 | Sato et al. | ............. 137/625.65 |
| 6,971,629 B2 | * | 12/2005 | Okada et al. | .......... 251/129.15 |

FOREIGN PATENT DOCUMENTS

JP    2004-156709    6/2004

* cited by examiner

*Primary Examiner*—Eric Keasel
*Assistant Examiner*—John K. Fristoe, Jr.
(74) *Attorney, Agent, or Firm*—Oblon, Spivak, McClelland, Maier & Neustadt, P.C.

(57) ABSTRACT

A synthetic resin cap is attached to the tip portion of a movable iron core of a solenoid operation portion, a sliding portion extending to the position of a magnetic plate is formed in the base end portion of the cap, a guiding concave step portion having a depth equal to or less than one half of the thickness of the magnetic plate is formed in the inner peripheral portion of the magnetic plate, and the movable iron core and the magnetic plate being not in contact with each other are held by the sliding portion fitted into the concave step portion so as to freely slide.

8 Claims, 3 Drawing Sheets

SOLENOID VALVE

TECHNICAL FIELD

The present invention relates to a solenoid valve having a valve member for switching a flow path driven by a movable iron core of a solenoid operation portion.

BACKGROUND ART

In the following Patent Document 1, a solenoid valve composed of a main valve portion having a valve member for switching a flow path and a solenoid operation portion for operating the valve member is disclosed. In the solenoid valve, the solenoid operation portion contains, inside a U-shaped magnetic frame, a hollow bobbin having an exciting coil wound therearound; a magnetic plate disposed on one end side in the axial direction of the bobbin and magnetically coupled to the magnetic frame; a fixed iron core fixedly set inside the inner hole of the bobbin and magnetically coupled to the magnetic frame; a movable iron core movably provided inside the inner hole of the bobbin and the magnetic plate, and attracted to the fixed iron core by magnetic attraction generated by the flow of electric current through the exciting coil; and an iron core return spring for making the movable iron core return to the initial position separated from the fixed iron core. Then, the valve member is driven by the movable iron core.

Patent Document 1: Japanese Unexamined Patent Application Publication No. 2004-156709

However, in such a solenoid valve, although the movable iron core moves inside the inner holes of the bobbin and the magnetic plate, at that time, when the movable iron core slides in contact with the magnetic plate, the resistance caused by sliding between metals increases and there is a fear that the movable iron core loses smooth movement. Furthermore, a problem in that damage such as scratches and wear are caused on the surface of the movable iron core and the magnetic plate by sliding between metals easily occurs.

DISCLOSURE OF INVENTION

Now, it is an object of the present invention to solve the above problem by making a movable iron core and a magnetic plate not come in contact with each other in a solenoid valve in which the movable iron core slides inside the inner hole of a bobbin and the magnetic plate.

In order to attain the above object, a solenoid valve of the present invention comprises a main valve portion containing a valve member for switching a flow path; and a solenoid operation portion for operating the valve member, the solenoid operation portion containing, inside a magnetic frame, a hollow bobbin having an exciting coil wound therearound; a magnetic plate having an inner hole lying next to an inner hole of the bobbin, disposed on one end side in the axial direction of the bobbin, and magnetically coupled to the magnetic frame; a fixed iron core fixedly disposed inside the inner hole of the bobbin, and magnetically coupled to the magnetic frame; a movable iron core movably provided inside the inner holes of the bobbin and the magnetic plate, and attracted to the fixed iron core by magnetic attraction generated by the flow of electric current through the exciting coil; and an iron core return spring for making the movable iron core return to the initial position separated from the fixed iron core. In the solenoid valve, the valve member is driven by the movable iron core, a synthetic resin cap is fitted into the tip portion of the movable iron core and a sliding portion extending to the position of the magnetic plate is formed at the base end portion of the cap, and a guiding concave step portion having a depth being equal to or less than one half of the thickness of the magnetic plate is formed on the surface facing the cap in the inner peripheral portion of the magnetic plate, and the movable iron core and the magnetic plate are held in a state to be not in contact with each other by the sliding portion of the cap fitted into the concave step portion so as to freely slide.

In the present invention, the cap, having an additional function as a spring seat for the iron core return spring, contains a hollow cap main body surrounding the outer periphery of the tip portion of the movable iron core, a flange-like spring seat portion extending from the tip portion of the cap main body, and the hollow sliding portion formed at the base end of the cap main body and extending in the direction of the axial line, and wherein the sliding portion is divided into a plurality of constituent parts by cuts in the direction of the axial line and the constituent parts are elastically in contact with the inner peripheral surface of the ring-shaped concave step portion.

In the present invention, it is desirable that a ring-shaped protruding wall portion is formed on the side face being in contact with the bobbin in the inner peripheral portion of the magnetic plate and the height of the protruded wall portion may be equal to or more than the depth of the concave step portion.

According to the present invention, a synthetic resin cap set with the tip of a movable iron core and the concave step portion of a magnetic plate slide with each other to guide the operation of the movable iron core and the movable iron core itself is held so as not to be in contact with the magnetic plate. Accordingly, a problem in that the movable iron core is in direct contact with the magnetic plate as in the conventional case does not occur, and not only the operation of the movable iron core is smooth, but also the surface of the movable iron corer and the magnetic plate does not receive damage such as scratches and wear.

Furthermore, since the depth of the concave step portion has been made equal to or less than one half of the thickness of the magnetic plate, the magnetic loss due to the formed concave step portion can be suppressed so as to be small.

BEST MODE FOR CARRYING OUT THE INVENTION

Figure 1:
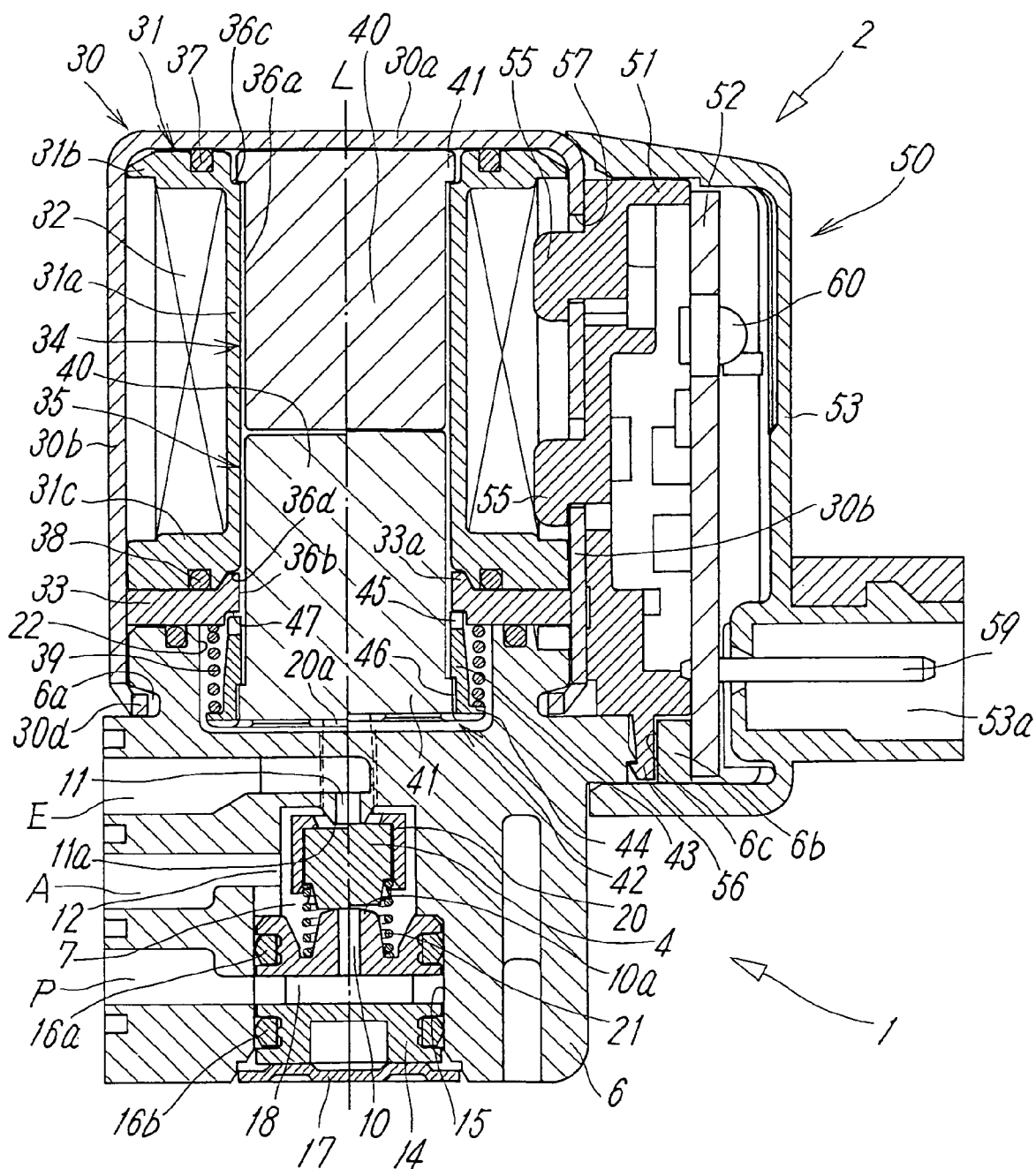
FIG. 1 is a sectional view showing one embodiment of a solenoid valve according to the present invention.

The drawings show one typical embodiment of a solenoid valve according to the present invention. The solenoid valve contains a main valve portion 1 having a valve member 4 for switching a flow path and a solenoid operation portion 2 for operating the valve member 4, and these main valve portion 1 and solenoid operation portion 2 are connected in series in the direction of the axial line L of the solenoid valve.

The main valve portion 1 contains a non-magnetic housing 6 having a rectangular section. A supply port P, an output port A, and an exhaust port E are provided on one side face of the housing 6, a circular valve chamber 7 is formed at a location on the axial line L inside the housing, and the P, A, and E ports are linked to the valve chamber 7. The supply port P and the exhaust port E are linked to the valve chamber 7 at locations where the supply port P and the exhaust port E face each other, and the output port A is linked to the valve chamber 7 at a location between them. That is, the supply port P is linked to the inside of the valve chamber 7 through a supply orifice 10 formed on the axial line L on the bottom wall of the valve chamber 7, the exhaust port E is linked to the inside of the valve chamber 7 through an exhaust orifice 11 formed at a location on the axial line L on the top wall of the valve chamber 7, and the output port A is linked to the inside of the valve chamber 7 through an output orifice 12 formed on the side wall of the valve chamber 7.

Furthermore, in the valve chamber 7, the poppet valve member 4 is housed so as to freely move in the direction of the axial line, the valve member 4 is driven by the solenoid operation portion 2, and the orifices 10 and 11 are opened and closed in such a way that the valve member 4 is made to be in contact with and removed from the supply valve seat 10a around the supply orifice 10 and the exhaust valve seat 11a around the exhaust orifice 11. Then, when the valve member 4 closes the exhaust orifice 11, the supply orifice 10 is linked to the supply port P and the output port A through the valve chamber 7 and the output orifice 12, and, when the valve member 4 closes the supply orifice 10, the output orifice 12 is linked to the output port A and the exhaust port E through the valve chamber 7 and the exhaust orifice 11.

The supply orifice 10 and the supply valve seat 10a are provided in a retainer 14 which determines the edge portion of the valve chamber 7. The retainer 14 is a short cylindrical member, and the retainer 14 is attached to the housing 6 in such a way that the retainer 14 is inserted in an attachment hole 15 linking to one end of the valve chamber 7 through two seal members 16a and 16b from the end portion of the housing 6 and supported by a fixing plate 17 latched to the housing 6 from the outside. Inside the retainer 14, a linking hole 18 passing to the supply port P is provided in the diameter direction at a location between the two seal members 16a and 16b and the linking hole 18 is linked to the supply orifice 10.

Furthermore, the valve member 4 is a short cylindrical member made of rubber or synthetic rubber and is held in a cylindrical synthetic resin valve holder 20 mating therewith, and the valve member 4 is pressed toward the side of the exhaust valve seat 11a by the spring force of a valve return spring 21 provided between the valve member 4 and the retainer 14. A pair of push rods 20a parallel to each other and extending in the direction of the axial line L is integrally provided on both left and right side faces of the valve holder 20, and the tip of the push rods 20a is extended inside an iron core chamber 22 formed between the housing 6 and the solenoid operation portion 2 through a rod hole formed in the housing 6. The iron core chamber 22 is formed in a concave portion provided in the housing 6.

Figure 2:
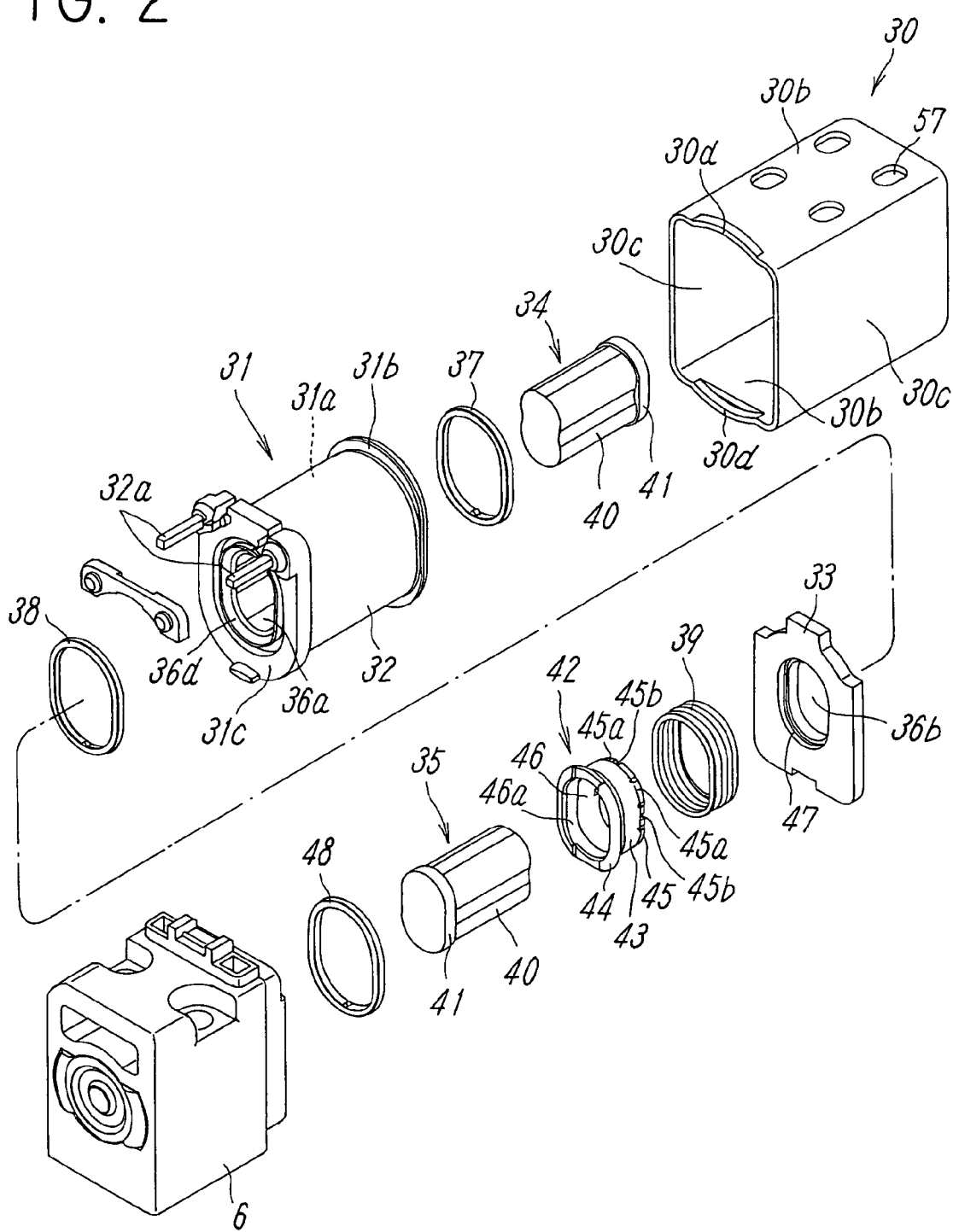
FIG. 2 is an exploded perspective view of a solenoid operation portion of the solenoid valve in FIG. 1.

As is clear from FIG. 2, the solenoid operation portion 2 contains a magnetic frame 30 made of a magnetic material such as iron, etc., which is joined to the housing 6 of the main valve portion 1, and, inside the magnetic frame 30, a non-magnetic hollow bobbin 31 on which an exciting coil 32 is wound, a magnetic plate 33 magnetically coupled to the magnetic frame existing between one end of the bobbin 31 and the housing 6, the magnetic plate 33 the external of which is in contact with the magnetic frame 30, inner holes 36a and 36b extending over the bobbin 31 and the magnetic plate 33, and a magnetic fixed iron core 34 and a magnetic movable iron core 35 set in the inner holes 36a and 36b are contained.

Moreover, hereinafter, except for the case where it is required to distinguish the inner hole 36a inside the bobbin 31 and the inner hole 36b inside the magnetic plate 33, a reference numeral 36 common to the holes is used.

The magnetic frame 30 is of a square cylinder having a substantially rectangular section and contains a top plate portion 30a covering one end in the direction of the axial line L, side plate portions 30b and 30b in the long diameter direction, and side plate portions 30c and 30c in the short diameter direction. Latch portions 30d formed by cutting in are provided in the lower end portion of the side plate portions 30b and 30b in the long diameter direction, and the magnetic frame 30 is joined to the housing 6 in such a way that the shape of the latch portions 30d is changed inward and the latch portions 30d are latched to the latch concave portions 6a on the side face of the housing 6.

The bobbin 31 has a substantially elliptical section and contains a bobbin main body 31a in the middle where the coil 32 is wound on the external surface and a first flange portion 31b and second flange portion 31c formed in both end portions in the direction of the axial line L of the bobbin main body 31a. The first flange portion 31b at the upper end is in contact with the top plate portion 30a of the magnetic frame 30 through a seal member 37, the second flange portion 31c at the lower end is in contact with the magnetic plate 33 through a seal member 38, and the iron core chamber 22 is formed between the magnetic plate 33 and the housing 6.

Furthermore, the inner hole 36 also has a substantially elliptical section. In the inner hole 36a extending inside the bobbin 31, although the shape of the section and the dimension are substantially uniform excluding both end portions in the direction of the axial line L of the bobbin 31, the hole diameter is slightly expanded at both end portions and step portions 36c and 36d are formed at locations inside both flange portions 31b and 31c, respectively. Then, a ring-shaped protruded wall portion 33a formed around the inner peripheral portion being in contact with the bobbin 31 of the magnetic plate 33, that is, the inner hole 36b is set with the step portion 36d on the side of the lower second flange portion 31c.

The fixed iron core 34 and the movable iron core 35 are formed so as to have the same shape and dimension and the same magnetic properties by using the same material. Accordingly, both the iron cores 34 and 35 are compatible with each other and can be used for both uses. That is, both the iron cores 34 and 35 have a substantially elliptical section in which the longitudinal and transverse diameters are different from each other, the iron cores 34 and 35 contains a main body 40 in which the shape of the section is uniform over the whole length and a flange-shaped large diameter portion 41 formed at one end in the direction of the axial line L of the main body 40, and the length in the direction of the axial line L of the large diameter portion 41 is shorter than the length in the direction of the axial line L of the main body portion 40.

The two iron cores 34 and 35 are provided inside the inner holes 36a and 36b of the bobbin 31 and the magnetic plate 33 so that the end faces of the main body portions 40 and 40 may face each other and the main body portions 40 and 40 may be in opposite direction.

The fixed iron core 34 is magnetically coupled with the magnetic frame 30 by the end face on the side of the large diameter portion 41 being in contact with the inner surface of the top plate portion 30a of the magnetic frame 30, and the large diameter portion 41 is held and fixed between the step portion 36c and the top plate portion 30a by the large diameter portion 41 being latched to the step portion 36*c* on the side of the upper first flange portion 31*b* of the bobbin 31.

Furthermore, the tip portion on the side of the large diameter portion 41 of the movable iron core 35 is extended from the inner hole 36 to the inside of the iron core chamber 22, and a synthetic resin cap 42 is attached to the tip portion.

The cap 42 has a function to guide the movable iron core 35 and a function as a spring seat for the iron core return spring 39 and contains a hollow cap main body 43 in which the sectional area surrounding the tip portion of the movable iron core 35 is elliptical, a spring seat portion 44 which extends from the tip portion of the cap main body 43 to its side like a flange, and a hollow sliding portion 45 extending in the direction of the axial line L from the base end of the cap main body 43. Furthermore, an expansion portion 46*a* in which the inner diameter is expanded in accordance with the large diameter portion 41 of the movable iron core 35 is formed at the tip of the inner hole 46 of the cap 42. Then, the cap 42 is joined to the movable iron core 35 from the side of the base end portion and made to advance to a position where the step portion at the back edge of the expansion portion 46*a* is latched to the back edge portion of the large diameter portion 41. Thus, the cap 42 is attached to the tip portion of the movable iron core 35 so as not to move forward from the point.

The coil-shaped iron core return spring 39 for returning the movable iron core 35 to the initial position separating the movable iron core 35 from the fixed iron core 34 is provided between the spring seat portion 44 and the magnetic plate 33.

Furthermore, the sliding portion 45 is fitted into the concave step portion 47 formed in the inner peripheral portion of the face (face on the side of the iron core chamber 22) facing the cap 42 of the magnetic plate 33 so as to freely slide. The sliding portion 45 is divided into a plurality of constituent parts by a plurality of cuts 45*b* made in the direction of the axial line, each of the constituent parts 45*a* is elastically in contact with the inner peripheral surface of the concave step portion 47, and the movable iron core 35 is held so as to be free from contact with both the magnetic plate 33 and the bobbin 31 by the concave step portion 47 guiding the sliding portion 45.

Figure 3:
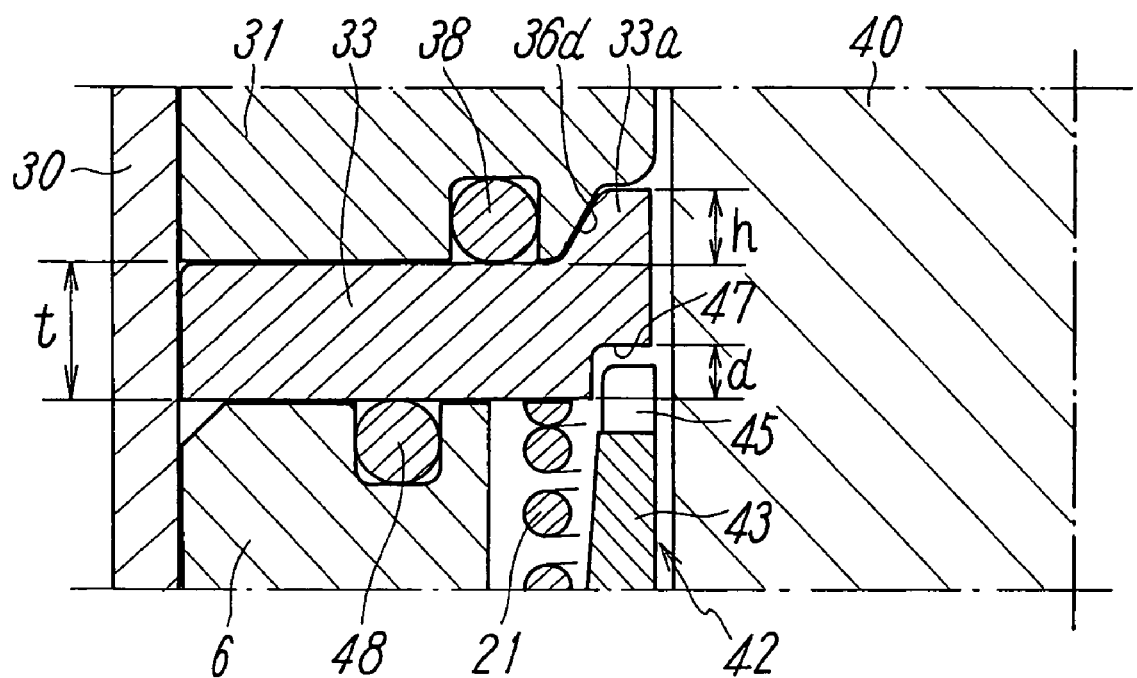
FIG. 3 is a partially expanded view of a magnetic plate in FIG. 1.

As shown in FIG. 3, the depth d of the concave step potion 47 of the magnetic plate 33 is made to be equal to or less than one half of the thickness t of the magnetic plate 33, that is, the concave step portion 47 is formed so as to have a relation of $d \leq t/2$. In this way, the magnetic loss between the magnetic plate 33 and the movable iron core 35 to be caused by forming the concave step portion 47 can be suppressed to the utmost. In this case, when the height h of the protruded wall portion 33*a* is made equal to or higher than the depth d of the concave step portion 47 ($d \leq h$), the magnetic loss caused by the concave step portion 47 also can be compensated.

Moreover, reference numeral 48 in the drawing represents a seal member disposed between the housing 6 and the magnetic plate 33.

In the solenoid operation portion 2, when the exciting coil 32 is not energized, as shown in the left half portion in FIG. 1, the movable iron core 35 occupies the initial position where the movable iron core 35 is separated from the fixed iron core 34 by the spring force of the iron core return spring 39. At this time, the push rod 20*a* is pushed by the movable iron core 35, since the valve member 4 is pressed on the supply valve seat 10*a*, the supply orifice 10 is closed and the exhaust orifice 11 is opened, and the output port A and the exhaust port E are linked to each other through the valve chamber 7. When the exciting coil 32 is energized in this state, as shown in the right half portion in FIG. 1, since the movable iron core 35 is attracted to the fixed iron core 34 and occupies the operational position, the valve member 4 is pressed on the exhaust valve seat 11*a* by the spring force of the valve return spring 21 and the supply orifice 10 is opened to close the exhaust orifice 11. Thus, the supply port P and the output port A are linked to each other through the valve chamber 7.

When the flow of electric current through the exciting coil 32 is stopped, the movable iron core 35 returns to the initial position because of the spring force of the iron core return spring 39.

At this time, the movable iron core 35 is guided by the sliding portion 45 of the synthetic resin cap 42 sliding in the concave step portion 47 of the magnetic plate 33, and then, since the moving iron core 35 is held so as to have a minute gap to the magnetic plate 33 and not to be in contact with the magnetic plate 33, the movable iron core 35 does not directly contact the magnetic plate 33. Accordingly, there is no problem in that the sliding resistance accompanying the contact between metals increases, and not only the operation of the movable iron core is smooth, but also the surface of the movable iron core 35 and the magnetic plate 33 does not receive damage such as scratches and wear.

Furthermore, since the depth d of the concave step portion 47 has been made equal to or less than one half of the thickness t of the magnetic plate 33, the magnetic loss between the magnetic plate 33 and the movable iron core 35 caused by forming the concave step portion 47 can be reduced to the utmost.

A terminal portion 50 for the flow of electric current to the solenoid operation portion 2 is provided on the side face of the solenoid valve. The terminal portion 50 contains a terminal base 51 attached over the magnetic frame 30 and the housing 6, a printed-circuit board 52 held on the terminal base 51, and a terminal cover 53, which can be freely attached and removed, covering the terminal base 51 and the board 52. The terminal base 51 in the shape of a shallow rectangular plate contains four hooks 55 formed on the back and a pair of left and right latch protrusions 56 formed on the lower end portion, and is fixed over the magnetic frame 30 and the housing 6 in such a way that the hooks 55 are latched to four latch holes 57 of a side wall portion 30*b* of the magnetic frame 30 and that the protrusions 56 are latched to a pair of left and right protruded wall portions 6*b* of the side face of the housing 6.

An external connection terminal 59, a display, lamp 60, and other electronic parts are mounted on the printed-circuit board 52. The external connection terminal 59 is electrically connected to a coil terminal 32*a* extended from the bobbin 31 through a print wiring on the board 52 and the tip portion is extended in a bayonet base 53*a* formed in the terminal cover 53.

Moreover, in the above embodiment, although a poppet three-port valve is shown, the switching method and number of ports of a solenoid valve are not limited to those. That is, the switching method may be of spool type, and also the number of ports may be two, four, or five.

The invention claimed is:

1. A solenoid valve comprising:
   a main valve portion containing a valve member for switching a flow path; and
   a solenoid operation portion for operating the valve member, the solenoid operation portion containing, inside a magnetic frame, a hollow bobbin having an exciting coil wound therearound; a magnetic plate having an inner hole lying next to an inner hole of the bobbin, disposed on one end side in the axial direction of the bobbin, and magnetically coupled with the magnetic frame; a fixed iron core fixedly disposed inside the inner hole of the bobbin, and magnetically coupled to the magnetic frame; a movable iron core movably provided inside the inner holes of the bobbin and the magnetic plate, and attracted to the fixed iron core by magnetic attraction generated by the flow of electric current through the exciting coil; and an iron core return spring for making the movable iron core return to the initial position separated from the fixed iron core, wherein the valve member is driven by the movable iron core, wherein a synthetic resin cap is set with the tip portion of the movable iron core and a sliding portion extending to the position of the magnetic plate is formed at the base end portion of the cap, and wherein a guiding concave step portion having a depth being equal to or less than one half of the thickness of the magnetic plate is formed on the surface facing the cap in the inner peripheral portion of the magnetic plate, and the movable iron core and the magnetic plate are held in a state to be not in contact with each other by the sliding portion of the cap slidably fitted into the concave step portion.

2. A solenoid valve as claimed in claim 1, wherein the cap, having an additional function as a spring seat for the iron core return spring, contains a hollow cap main body surrounding the outer periphery of the tip portion of the movable iron core, a flange-shaped spring seat portion extending from the tip portion of the cap main body, and the hollow sliding portion formed at the base end of the cap main body and extending in the direction of the axial line, and wherein the sliding portion is divided into a plurality of constituent parts by cuts in the direction of the axial line and the constituent parts are elastically in contact with the inner peripheral surface of the ring-shaped concave step portion.

3. A solenoid valve as claimed in claim 2, wherein an annular protruded wall portion is formed on the side face being in contact with the bobbin in the inner peripheral portion of the magnetic plate and the height of the protruded wall portion is equal to or more than the depth of the concave step portion.

4. A solenoid valve as claimed in claim 3, wherein a flange-shaped large diameter portion is formed at the tip of the movable iron core, an expansion portion is formed at the tip of the inner hole of the cap, and the cap is controlled not to fall off from the movable iron core by the large diameter portion latched to the expanded portion.

5. A solenoid valve as claimed in claim 2, wherein a flange-shaped large diameter portion is formed at the tip of the movable iron core, an expansion portion is formed at the tip of the inner hole of the cap, and the cap is controlled not to fall off from the movable iron core by the large diameter portion latched to the expanded portion.

6. A solenoid valve as claimed in claim 1, wherein an annular protruded wall portion is formed on the side face being in contact with the bobbin in the inner peripheral portion of the magnetic plate and the height of the protruded wall portion is equal to or more than the depth of the concave step portion.

7. A solenoid valve as claimed in claim 6, wherein a flange-shaped large diameter portion is formed at the tip of the movable iron core, an expansion portion is formed at the tip of the inner hole of the cap, and the cap is controlled not to fall off from the movable iron core by the large diameter portion latched to the expanded portion.

8. A solenoid valve as claimed in claim 1, wherein a flange-shaped large diameter portion is formed at the tip of the movable iron core, an expansion portion is formed at the tip of the inner hole of the cap, and the cap is controlled not to fall off from the movable iron core by the large diameter portion latched to the expanded portion.

* * * * *